(12) United States Patent
Johnson et al.

(10) Patent No.: US 11,719,249 B2
(45) Date of Patent: *Aug. 8, 2023

(54) INTEGRATED THERMAL COMFORT CONTROL SYSTEM WITH VARIABLE MODE OF OPERATION

(71) Applicant: DELTA T, LLC, Lexington, KY (US)

(72) Inventors: Jerrill Scott Johnson, Lexington, KY (US); Alex Christopher Reed, Lexington, KY (US); Marcus Landon Borders, Lexington, KY (US); Thomas James Lesser, Lexington, KY (US); Jason Hunt Fizer, Lexington, KY (US); Adam Glenn Tucker, Georgetown, KY (US); Stephen Alexander Harper, Lexington, KY (US); Ernest John Noble, Selangor (MY); Ken Siong Tan, Selangor (MY); Jon Jet Ling, Selangor (MY); Seng Rui Chan, Selangor (MY)

(73) Assignee: DELTA T, LLC, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,211

(22) Filed: Oct. 12, 2020

(65) Prior Publication Data

US 2021/0095680 A1 Apr. 1, 2021

Related U.S. Application Data

(63) Continuation of application No. 15/540,321, filed as application No. PCT/US2015/068026 on Dec. 30, 2015, now Pat. No. 10,801,508.

(Continued)

(51) Int. Cl.
*F04D 25/08* (2006.01)
*F04D 27/00* (2006.01)
(Continued)

(52) U.S. Cl.
CPC ........ *F04D 25/088* (2013.01); *F04D 27/004* (2013.01); *F24F 7/10* (2013.01);
(Continued)

(58) Field of Classification Search
CPC ............ F04D 26/088; F24F 11/30; F24F 7/10
(Continued)

(56) References Cited

U.S. PATENT DOCUMENTS 6,587,642 B1 * 7/2003 King ..................... F24F 1/0093
392/364
10,801,508 B2 * 10/2020 Johnson ................... F24F 11/30
(Continued)

FOREIGN PATENT DOCUMENTS

WO 2014071046 A1 5/2014

*Primary Examiner* — Vivek K Shirsat
(74) *Attorney, Agent, or Firm* — Dickinson Wright PLLC; Andrew D. Dorisio

(57) ABSTRACT

A system for controlling thermal comfort in a space is provided with variable mode of operation. This system may include a conditioner for conditioning air in the space, and a sensor for measuring a temperature in the space. A controller is provided for controlling the conditioner based on the temperature sensed by the sensor, and a fan for circulating air within the space is regulated based on the temperature sensed by the sensor. A related system for controlling a fan based on height is also provided, as is a system and method for easily and efficiently determining the height of a fan using a simple camera, such as one on a "smart" phone. A further aspect pertains to a controller, such as for example a portable handheld device, having a user interface adapted for suggesting an increase in a set point temperature of a thermostat based on the selected speed of the fan.

4 Claims, 10 Drawing Sheets

Related U.S. Application Data

(60) Provisional application No. 62/150,986, filed on Apr. 22, 2015, provisional application No. 62/097,860, filed on Dec. 30, 2014.

(51) Int. Cl.
| | | |
|---|---|---|
| *F24F 11/58* | (2018.01) | |
| *F24F 11/76* | (2018.01) | |
| *F24F 11/57* | (2018.01) | |
| *F24F 11/63* | (2018.01) | |
| *F24F 11/77* | (2018.01) | |
| *F24F 11/30* | (2018.01) | |
| *F24F 7/10* | (2006.01) | |
| *F24F 110/20* | (2018.01) | |
| *F24F 110/00* | (2018.01) | |
| *F24F 110/10* | (2018.01) | |
| *F24F 13/32* | (2006.01) | |

(52) U.S. Cl.
CPC .............. *F24F 11/30* (2018.01); *F24F 11/57* (2018.01); *F24F 11/58* (2018.01); *F24F 11/63* (2018.01); *F24F 11/76* (2018.01); *F24F 11/77* (2018.01); *F05D 2270/303* (2013.01); *F24F 13/32* (2013.01); *F24F 2110/00* (2018.01); *F24F 2110/10* (2018.01); *F24F 2110/20* (2018.01)

(58) Field of Classification Search
USPC ........................................................ 454/258
See application file for complete search history.

(56) References Cited

U.S. PATENT DOCUMENTS

| | | | | |
|---|---|---|---|---|
| 2007/0114295 | A1* | 5/2007 | Jenkins | .................... F24F 11/30 236/51 |
| 2009/0014545 | A1* | 1/2009 | Horiuchi | .................. F24F 11/30 236/49.3 |
| 2009/0140060 | A1* | 6/2009 | Stoner | ................ G05D 23/1934 236/51 |

* cited by examiner

INTEGRATED THERMAL COMFORT CONTROL SYSTEM WITH VARIABLE MODE OF OPERATION

This application incorporates by reference the disclosures of U.S. Provisional patent application Ser. Nos. 61/720,679, 61/755,627, 61/807,903, 62/092,532, 62/097,860, 62/097,860, 62/150,986, 13/790,646, and also International Patent Applications PCT/US13/067828 and PCT/US 15/27998. This application is a continuation of U.S. application Ser. No. 15/540,321, which is a National Stage of Application PCT/US2015/068026, the disclosures of which are incorporated herein by reference.

BACKGROUND

Ceiling fans have long been used in residences as an energy efficient means of increasing occupant thermal comfort in the summer and creating uniform air temperatures floor to ceiling in the winter. During months with colder weather, many residents utilize forced air heating systems to maintain comfortable conditions within their living spaces. As energy costs continue to rise, so does the cost for heating these spaces.

Historically, conventional ceiling fans have been used to mix the heat in a room with the colder air at floor level by running at relatively high speeds in reverse, with the hopes that either the thermostat(s) will be exposed to warmer air (so the heating system would run less frequently) or to allow for decreased thermostat set point (as a result of increased effective temperature after the air is mixed). This may require physical human intervention to change fan direction from forward to reverse and does not account for room occupancy or the state of the home's thermostat.

Further, research shows that running conventional ceiling fans in reverse can be noisy or otherwise distracting, may cause drafts along the perimeters of the room in which they are installed, and consume more energy than what is required to effectively mix the air by other methods. Ceiling fans, when operated intelligently, can optimize both energy conservation and thermal comfort during cooling and heating seasons. In fact, studies indicate that total energy savings (on heating and cooling) of up to 30% can be achieved by incorporating ceiling fans. Occupants of residences or commercial properties do not wish to adjust their fan configuration whenever they change the thermostat from a heating to a cooling setting, or vice versa.

Accordingly, a need is identified for an integrated thermal comfort control system that addresses any or all of the foregoing limitations.

SUMMARY

According to one aspect of the disclosure, a fan system for a space associated with a conditioner for conditioning air in the space is provided. The system comprises a sensor for measuring a temperature in the space, a controller for controlling the conditioner based on the temperature sensed by the sensor, and a fan for circulating air within the space based on the temperature sensed by the sensor.

In one embodiment, the controller comprises a thermostat, and the sensor is connected to the thermostat. In this or another embodiment, the fan comprises a fan adapted for being mounted to a ceiling in the space. The sensor may be connected to the fan, and may also provide temperature or other information for regulating other devices besides fan. Thus, for instance, the controller may include a set point temperature for regulating the on/off condition of the conditioner, and may be adapted for adjusting the set point temperature based on the temperature sensed by the sensor.

According to a further aspect of the disclosure, a fan system for circulating air within a space includes a fan for circulating air within the space, a sensor for sensing whether the space is occupied, and a controller for controlling the fan to operate at a first speed when the space is occupied and a second speed when the space is unoccupied. The first speed may be a pre-determined minimum speed or a user-defined minimum speed, and the second speed may be a pre-determined maximum speed.

In one embodiment, the fan is controlled to vary between the first speed and the second speed when the space is determined to be occupied. For instance, the fan may be controlled to vary sinusoidally between the first speed and the second speed. The fan may be controlled to vary between a maximum speed and a minimum speed.

In an unoccupied state of the space, the fan may be controlled to vary between a maximum speed for providing an appreciable level of detstratification and a second, lower speed. Alternatively or additionally, the fan may be controlled such that the first speed is a speed at which an appreciable air velocity is created at a particular distance from the fan.

In accordance with a further aspect of the disclosure, a fan system for circulating air within a space includes a fan for circulating air within the space and a controller for automatically controlling the fan to operate at a first speed in a winter mode of operation, and to automatically adjust the first speed to a second, lower speed during a subsequent automatic control operation when a user manually indicates that a third lower speed is desired during the operation of the fan at the first speed. The system may include a sensor for sensing whether the space is occupied, and wherein the controller automatically controls the fan to automatically adjust to the second speed only when the space is occupied.

Yet another aspect of the disclosure pertains to a fan system for circulating air within a space. The system includes a fan for circulating air within the space, the fan corresponding to a height within the space, and a controller for controlling the fan to operate at a fan speed based on the height. The controller may control the fan based on the height determined by an approximate distance from a floor of the space to an airfoil associated with the fan. The system may include a user input for inputting the distance. The system may also include a device for estimating the distance based on a plurality of photographs of the fan.

Still a further aspect of the disclosure pertains to a fan system for a space including a fan for circulating air within the space and a heater remote from the fan for supplying heated air to the space. The system comprises a thermostat for controlling the heater, and a controller for controlling the fan based on the activation of the heater.

Yet a further aspect of the disclosure pertains to an apparatus comprising a fan adapted for being controlled to operate according to a mode of operation based on a thermostat being in a heating or cooling mode. The fan may be controlled to operate according to a winter mode of operation when the thermostat is in a heating mode.

The disclosure additionally pertains to a system for conditioning a space associated with a unit for conditioning the air within the space. The system comprises a thermostat for controlling the unit, the thermostat having a set point temperature, a fan for circulating air in the space, and a controller for regulating the set point temperature of the thermostat based on a condition associated with the fan or the controller. The condition may be a temperature at the location of the fan, which may include a sensor for sensing the temperature. The condition may comprise an operational state of the fan, and the controller may comprise a portable handheld device or a wall controller.

A further aspect of the disclosure pertains to a system for conditioning a space associated with a unit for conditioning the air within the space. The system comprises a thermostat for controlling the unit, the thermostat having a set point temperature, a fan for circulating air in the space, and a controller adapted for regulating a speed of the fan and a set point temperature of the thermostat. The controller may comprise a portable handheld device having a user interface adapted for suggesting an increase in the set point temperature based on the selected speed of the fan.

An apparatus for circulating air in a space also forms a part of this disclosure, which apparatus includes a fan and means for determining an approximate height of the fan in the space. The means may comprise a device adapted for determining the approximate height based on a plurality of photographs of the fan. A controller may also be provided for controlling the fan, at least in part, based on the determined approximate height.

A further aspect of the present disclosure relates to a system for conditioning a plurality of zones associated with a unit for supplying conditioned air to the zones. Each zone may include a fan for circulating air in the zone, and a damper associated with supplying conditioned air from the unit to at least one of the zones. The system comprises a controller associated with each zone, the controller adapted for regulating the fan, the unit for conditioning the air, and the damper associated with each zone. The controller may be adapted for being mounted on a wall in each zone, and may also be adapted for controlling a light associated with each zone.

Yet a further aspect of the disclosure pertains to a system for conditioning a space associated with a unit including a blower for blowing conditioned air to the space. The system comprises a fan for circulating air in the space, and a controller for regulating the speed of the blower based on a condition associated with the fan or the controller.

Still another aspect of the disclosure relates to a fan having a plurality of blades mounted to a hub, a support member having an upper end portion and a lower end portion for supporting the hub, and a cover associated with (but not necessarily covering) the upper portion of the support member, the cover including at least one indicator for indicating a condition of the fan. The cover may cover includes a plurality of indicators for indicating the condition of the fan. The indicators may be arranged in an annular fashion around the support member. The cover may include an at least translucent portion for allowing light from the one or more indicators to pass.

Still another aspect of the disclosure pertains to a method for determining a height of a structure associated with an overhead fan. The method comprises determining the height of the structure based on first and second images of the overhead fan. The method may further include the steps of obtaining the first image of the fan taken with a camera located at a floor, and obtaining the second image of the fan taken with the camera located at a known height. The method may further include the step of providing an object having the known height for supporting the camera for obtaining the second image.

Yet another aspect of the disclosure pertains to a method of conditioning a space. The method comprises automatically adjusting an operating condition of a thermostat for controlling a conditioning unit for conditioning air in the space based on a sensed condition in the space.

Still a further aspect of the disclosure pertains to a method of conditioning a space. The method comprises automatically adjusting an operating condition of a thermostat for controlling a conditioning unit for conditioning air in the space based on an operating mode of a fan for moving air in the space.

Also in this disclosure is a method for conditioning a plurality of zones associated with a unit for supplying conditioned air to the zones, a fan for circulating air in each zone, and a damper associated with supplying conditioned air from the unit to at least one of the zones. The method includes, using a controller associated with at least one of the zones, regulating the fan, the unit for conditioning the air, and the damper associated with the zone based on a condition in the zone sensed by the controller. The sensed condition may be selected from the group consisting of temperature or occupancy.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
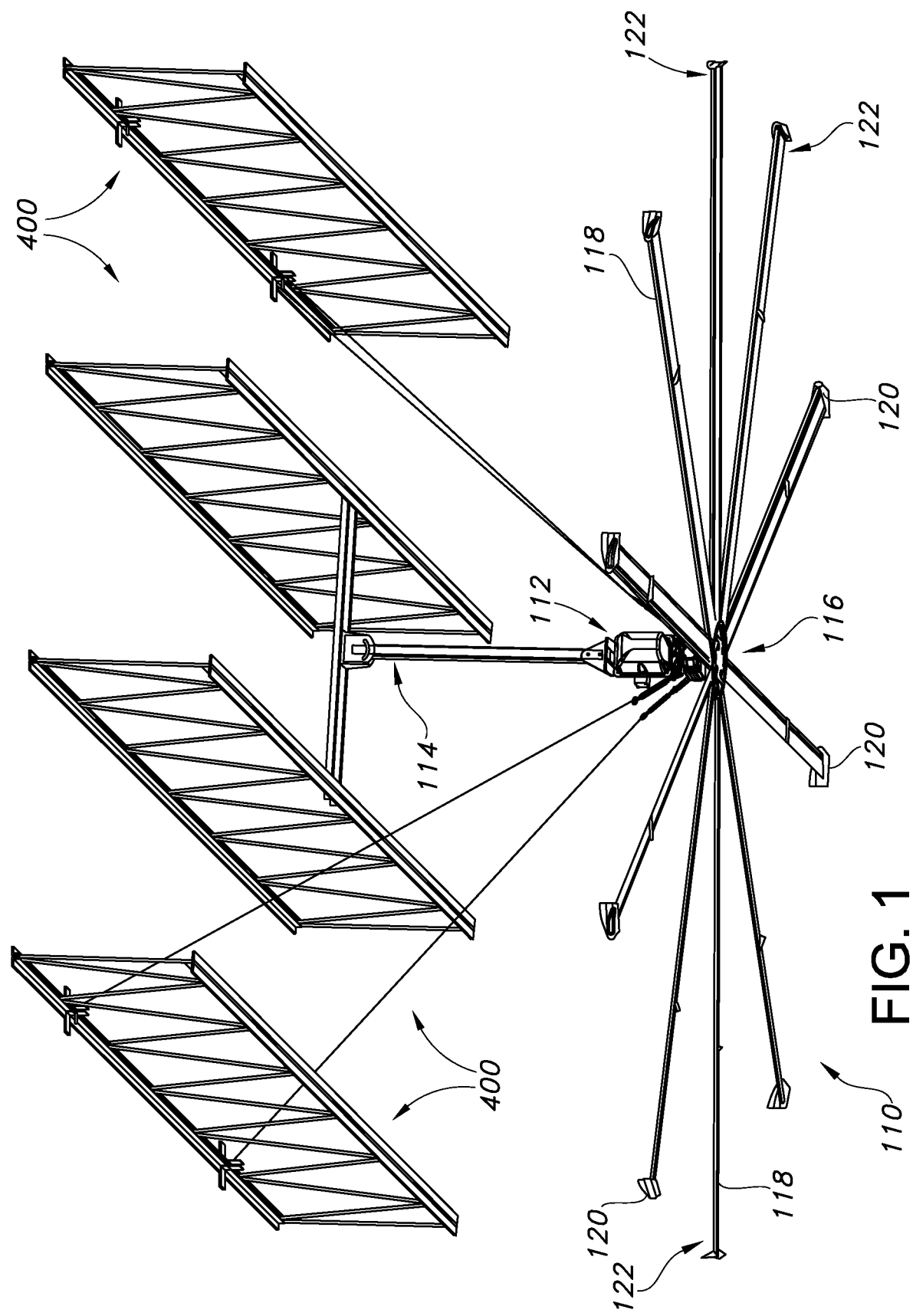
FIG. 1 depicts a perspective view of an exemplary fan having a motor assembly, a hub assembly, a support, a plurality of fan blades, and a mounting system coupled with joists.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the claimed invention. Other examples, features, aspects, embodiments, and advantages of the invention will become apparent to those skilled in the art from the following description, which includes by way of illustration, one or more of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Fan Overview

Figure 2:
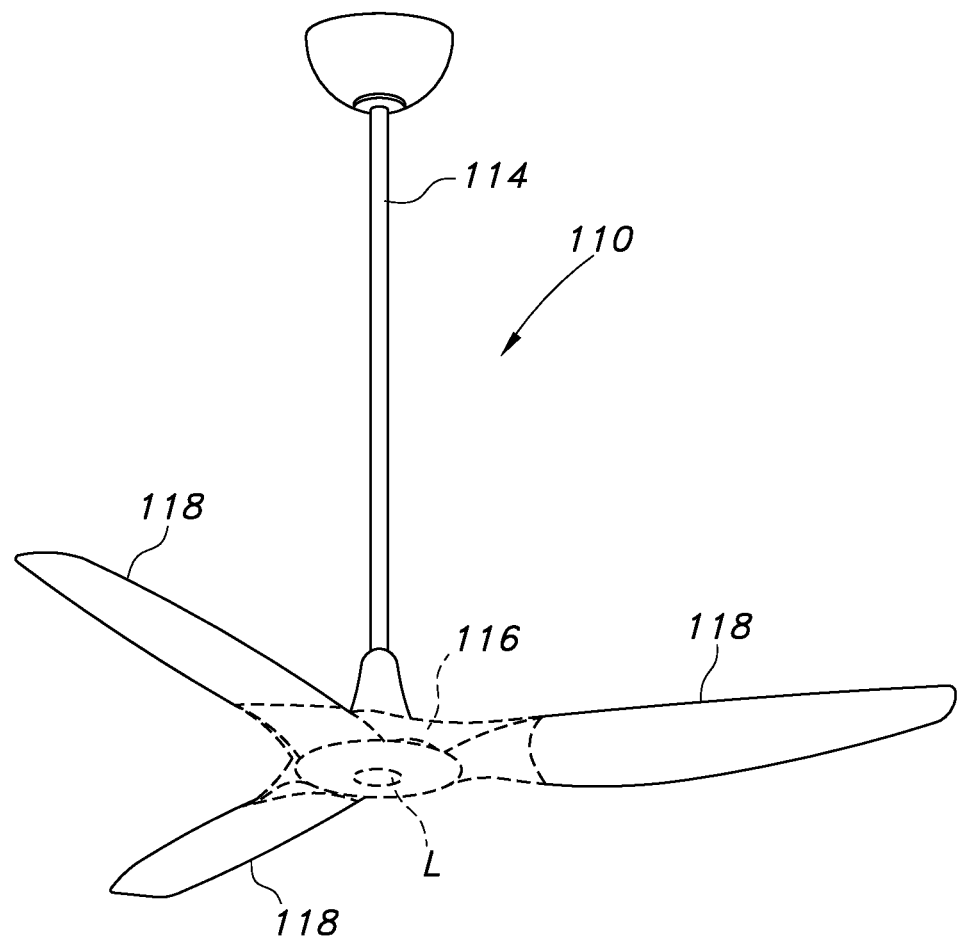
FIGS. 2 and 2A, 2B, and 2C include various views of exemplary fans.
Figure 2A:
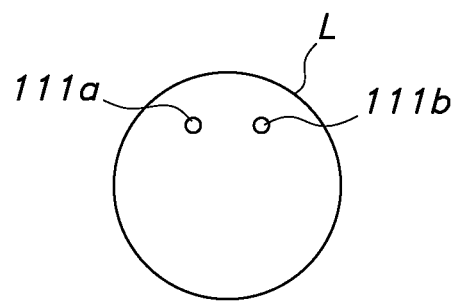

Referring to FIG. 1, a fan (110) of the present example comprises a motor assembly (112), a support (114), a hub (116), and a plurality of fan blades (118) or airfoils, which may include winglets (120). In the present example, fan (110) (including hub (116) and fan blades (118)) has a diameter of greater than about 3 feet and, more specifically, approximately 8 feet. In other variations, fan (110) has a diameter between approximately 6 feet, inclusive, and approximately 24 feet, inclusive. Alternatively, fan (110) may have any other suitable dimensions, such as a 3-7 foot overhead fan having an ornamental design for use in commercial or residential spaces (see FIG. 2), and having a support (114) mounted to the ceiling, such as along a joist (400) or otherwise. The particular type of fan (110) used is not considered important to controlling thermal comfort, but the concepts disclosed may have particular applicability to the types of fans for circulating air within a space or room, such as overhead ceiling fans depending from a ceiling with exposed, rotating blades, as shown in the drawings. Any embodiment disclosed herein may be considered to operate in connection with such overhead ceiling fan(s), at a minimum.

Figure 2B:
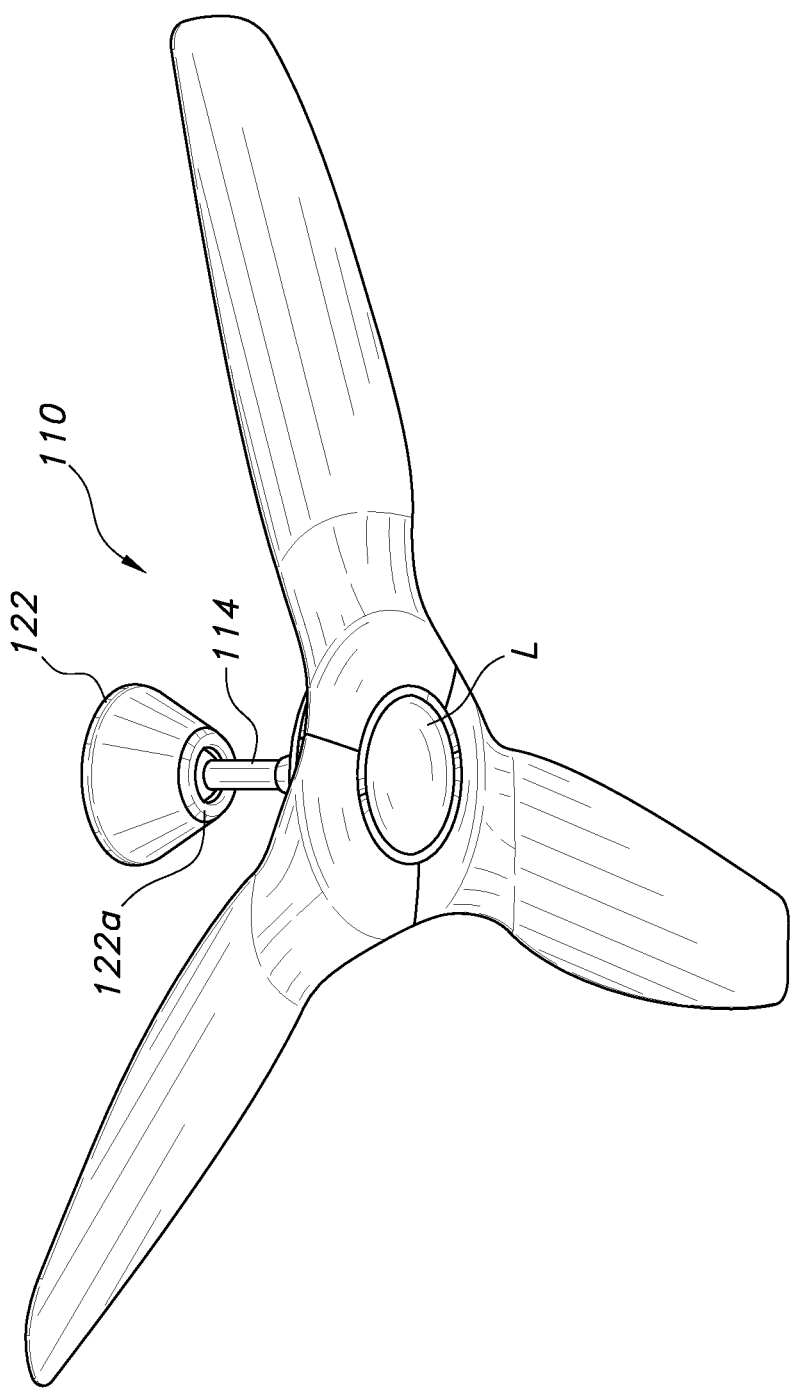

With reference to FIG. 2B, it can be understood that the fan (110) may be provided with one or more indicators, such as in the form of LED lights (111a, 111b). The lights (111a, 111b) may produce different colors of visible light or color temperature, and thus may be used to provide an indication of the mode of operation of the fan (for example, an indicator (111a) in blue may indicate operation in "Winter Mode," while an indicator (111b) in red may indicate operation in "Sleep Mode"). Alternatively, a particular pattern of lights may be an indication of mode (i.e., both lights (111a, 111b) on may indicate Winter Mode, whereas, one light on may indicate a regular or "non-Winter" mode of operation).

Figure 2C:
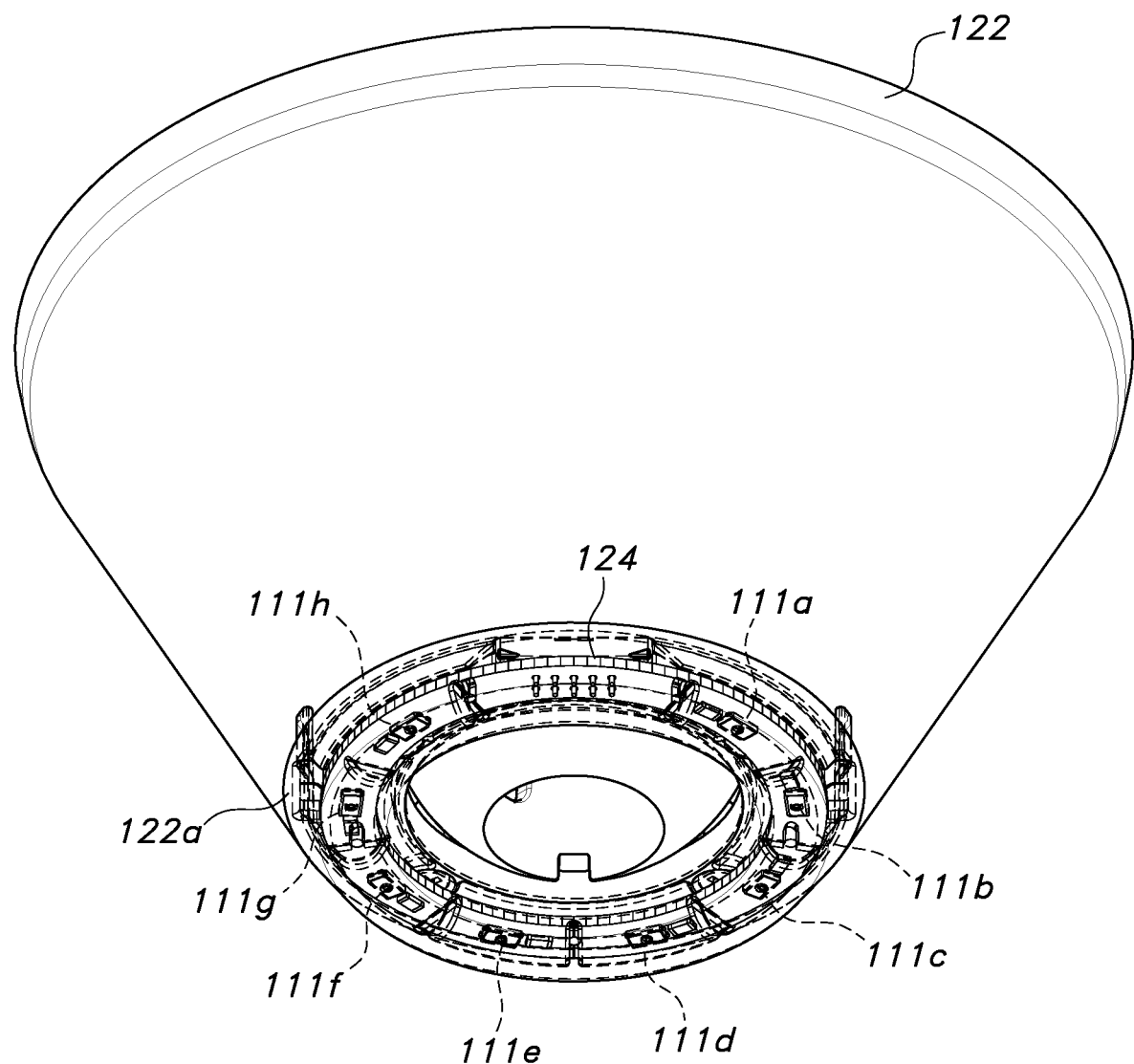

FIGS. 2B and 2C show a further example of a fan (110) including a main light (L) and a canopy (122) associated with the first or upper portion of the support (114), the second or lower end of which is connected to the hub (116). The canopy (122) may include the one or more indicators (111a, 111b) for indicating a particular mode of operation (such as for example speed, winter mode, summer mode, etc.). In the illustrated embodiment, the canopy (122) includes a transparent or semi-transparent window or lens (122a) that covers a plurality of lights forming indicators (111a-111h), such as LEDs (eight shown in the example, but more or fewer may be provided). The indicators (111a-111h) may be arranged in an annular configuration surrounding the support (114), and the lens (122a) may be a corresponding shape. The indicators (111a-111h) may be powered by an associated controller (124), which may be powered by the fan (110) and controlled by any associated controller (such as master control (160), as discussed below). The upper portion of the support (114) associated with the canopy (122) may include a ball for corresponding with a socket formed in the cover, as outlined further in U.S. patent application Ser. No. 13/790,646. Thus, the canopy (122) may also be considered to comprise a hanger for hanging the fan from a stable structure, such as a joist (400) or the ceiling.

II. Exemplary Thermal Comfort Control System

It may be desirable to utilize exemplary fan (110) disclosed above to improve the efficiency of a typical climate control system, thereby creating a thermal comfort control system (100). Exemplary fan (110) described above would improve the efficiency of a typical climate control system by circulating the air, thus preventing the formation of pockets of heated or cooled air in locations that do not benefit the occupants, or in which an increased difference between indoor and outdoor temperatures across an exterior wall and roof increases the rate of heat transfer through the surface. Another added benefit of exemplary fan (110) is that when the circulating air created by fan (110) comes into contact with human skin, the rate of heat transfer away from the human body increases, thus generating a cooling effect which allows for more efficient use of the HVAC system during periods of cooling.

Figure 3:
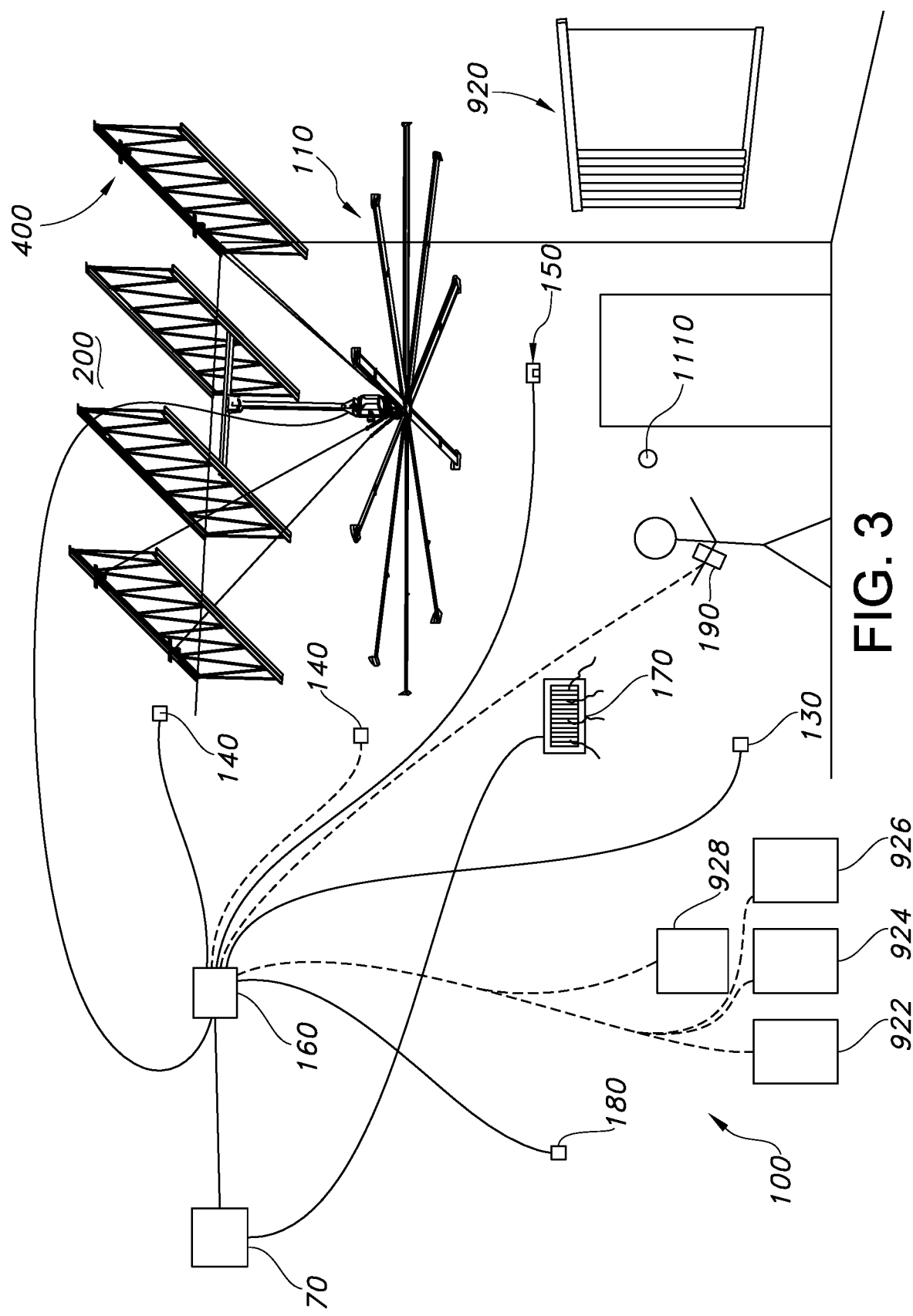
FIG. 3 depicts a perspective view of an exemplary thermal comfort control system utilizing circulating fans.
Figure 8:
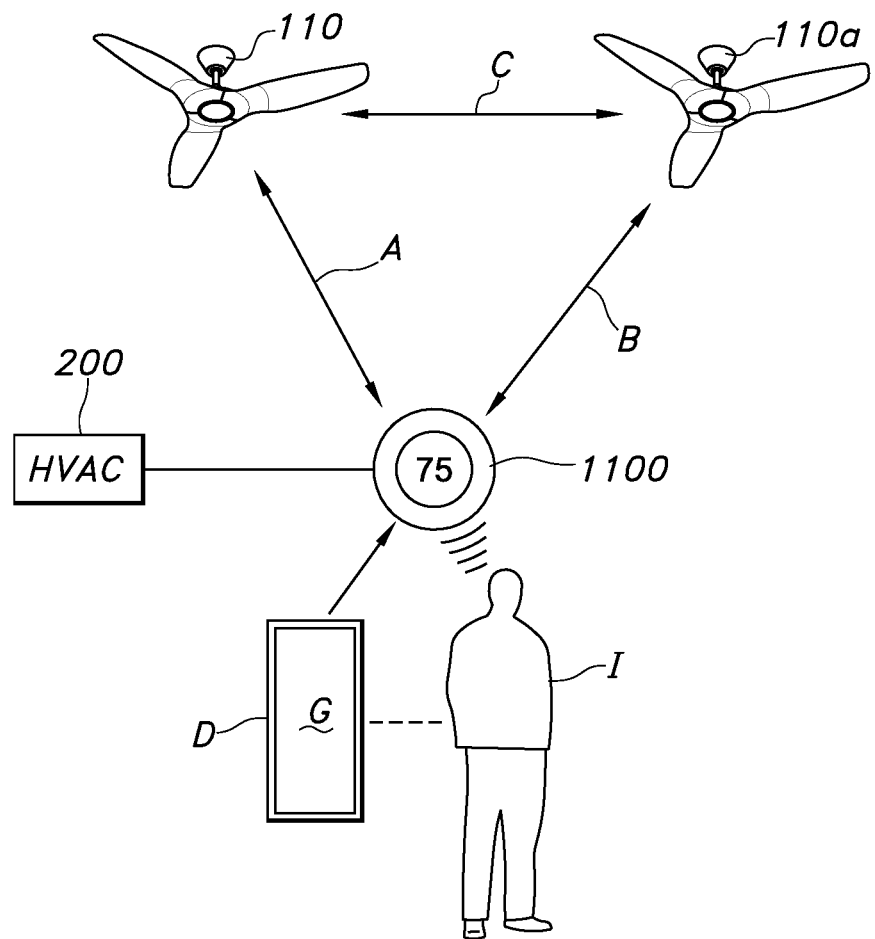
FIG. 8 depicts a further view of a fan and a thermostat.

By way of example only, an otherwise standard climate control system may be modified to form system (100) by including at least one exemplary fan (110), one or more temperature sensors (such as for example, at least one low-elevation sensor (130), at least one high-elevation sensor (140), and/or one or more thermostats (1110) adapted to sense temperature; see FIG. 8), at least one occupancy sensor (150), at least one controller (160), at least one HVAC system (200) or unit, and optionally at least one external sensor (180) as shown in FIG. 3. The control system (100) may comprise any group or selection of the foregoing components, or others described herein.

While exemplary thermal comfort control system (100) is shown as including an overhead fan (110) as described above, it should be understood that any other type of fan may be included in exemplary thermal comfort control system (100), including combinations of different types of fans. Such other fans may include pedestal mounted fans, wall mounted fans, or building ventilation fans, among others. It should also be understood that the locations of sensors (130, 140, 150, 180) as shown in FIG. 3 are merely exemplary. Sensors (130, 140, 150, 180) may be positioned at any other suitable locations, in addition to or in lieu of the locations shown in FIG. 3. By way of example only high-elevation sensor (140) may be mounted to a joist (400), to the fan (110), to the upper region of a wall, and/or in any other suitable location(s). Various suitable locations where sensors (130, 140, 150, 180) may be located will be apparent to those of ordinary skill in the art in view of the teachings herein. Furthermore, it should be understood that sensors (130, 140, 150, 180) themselves are mere examples. Sensors (130, 140, 150, 180) may be modified or omitted as desired.

Furthermore, various other kinds of sensors may be used as desired, in addition to or in lieu of one or more of sensors (130, 140, 150, 180). For example, a physiological sensor (190) associated with a user may be used to sense a physiological condition of the user, as illustrated in FIG. 3. The sensed physiological condition may relate to the user's metabolic equivalent of task (MET), heart rate, pulse, blood pressure, body temperature (either core temperature or skin temperature), respiration, weight, perspiration, blood oxygen level, galvanic skin response, or any other physiological condition. By way of example, the physiological sensor (190) may comprise a wearable sensor such as a wristband, armband, belt, watch, glasses, clothing accessory, or any other sensor capable of being worn by the user or attached to the user's body, or may comprise an item of furniture or an associated accessory (e.g., a pillow or cushion for a bed or couch). Additionally, the physiological sensor (190) may comprise an internal sensor, such as a sensor that has been embedded in the user or ingested.

Furthermore, system (100) may receive information from one or more other sources in addition to or in lieu of sensors (130, 140, 150, 180, 190), including but not limited to online sources. For instance, system (100) may receive one or more temperature values, other values, procedures, firmware updates, software updates, and/or other kinds of information via the Internet, through wire or wirelessly. Various suitable ways in which system (100) may communicate with the internet and/or other networks, as well as various types of information that may be communicated, will be apparent to those of ordinary skill in the art in view of the teachings herein.

As shown in FIG. 3, in such an exemplary thermal comfort control system (100), master controller (160) may determine an appropriate comfort control setting based a number of conditions which may include external temperature, room occupancy, and/or time of day, among other factors which may exist. As merely an example of such a comfort control setting determination, controller (160) may choose between "Heating" or "Cooling" based upon the internal and/or external sensed temperature, the controller may then choose between "Occupied" or "Unoccupied" based upon the sensed occupancy. These conditions, as well as others, may be communicated to controller (160) by one or more of the sensors mentioned above (130, 140, 150, 180, 190) and in a manner described below.

Although the appropriate comfort control setting is determined by controller (160) in exemplary thermal comfort control system (100) described above, other configurations of a thermal comfort control system (100) may allow for an occupant to choose between multiple comfort control settings. The comfort control settings may include, among other settings: "Occupied Heating" mode, "Unoccupied Heating" mode, "Occupied Cooling" mode, and "Unoccupied Cooling" mode. Each setting may have a programmable temperature set range associated with it, as well as the option to operate fan (110) as a part of a sequence of operations of HVAC system (200), both in response to the temperature being outside the relevant set range, and also, where appropriate, in response to other conditions such as a difference between the high-elevation temperature and the low-elevation temperature in a particular room as described below.

High-elevation sensor(s) (140) and low-elevation sensor(s) (130) may sense the temperature at various locations throughout a room (such as, for example, in an upper portion of a room (such as the location of the fan (110) for the high-elevation sensor and in a lower portion of the room (the area of occupancy) for a low-elevation sensor). The sensors may sense the air-dry bulb temperature, or wet bulb temperature, but do not necessarily have to sense either. High-elevation sensor(s) (140) and low-elevation sensor(s) (130) may also sense relative humidity, air speed, light levels, or other conditions which may exist. Of course, separate dedicated sensors may also be used to sense such other conditions which may exist. Alternatively, communication with a thermostat (1110) in the room or zone in which the fan is located may allow for operation based on that temperature, which may be communicated to the controller for controlling the fan.

In some versions, detected light levels may factor into control procedures by indicating whether it is sunny outside. For instance, a light sensor (such as, for example, a photocell) may capture ambient light within a room during daylight hours. Accounting for any light from a man-made or artificial light source (L), system (100) may react to light levels indicating significant sunlight reaching a room through one or more windows, such as by increasing cooling effects (such as by regulating the fan speed (e.g., increasing the speed based on more light being detected) and/or activating the HVAC system (200)) during summer time or by reducing heating effects during winter time under the assumption that the sunlight itself will provide at least a perceived heating effect on occupants of the room. The system (100) may also regulate the level of artificial light based on the sensed light, including any light associated with the fan (110) or otherwise.

As another merely illustrative example, a light sensor may indicate whether a room is occupied at night (e.g., a lit room at a time associated with night indicates current occupancy or expected occupancy of the room). As yet another merely illustrative example, detected light levels may trigger automated raising or lowering of blinds at windows of a room, either completely or to a particular level or amount of opening, or adjustments to other forms of window treatments. Other suitable ways in which light levels may be factored into a control procedure for system (100) will be apparent to those of ordinary skill in the art in view of the teachings herein. For instance, the light levels detected may be used to control lighting, including any light associated with the fan (110). Of course, some versions of system (100) may simply lack light sensing capabilities.

As shown in FIG. 3, high-elevation sensor(s) (140) may be located on fan (110), ceiling, or elsewhere in a room. Low-elevation sensor(s) (130) may be located at or near the level in which the room will be occupied. Optionally, the exemplary thermal comfort control system may include external sensors (180) that will sense the temperature, relative humidity, barometric pressure, or other conditions that may exist external to the building envelope. Finally, occupancy sensor(s) (150) will sense occupants within a room, and may comprise a thermal imager, a camera, or the like.

Occupancy sensor(s) (150) may be placed throughout a room, but may be especially effective in places of entry, as shown in FIG. 3. Sensors (130, 140, 150, 180) may be placed in a single room or zone, or may be placed in multiple rooms or zones. Measurements from high-elevation sensor(s) (140), low-elevation sensor(s) (130), external sensor(s) (180), and occupancy sensor(s) (150) may be communicated to the controller (160).

Controller (160) may include a processor capable of interpreting and processing the information received from sensors (130, 140, 150, 180, 190) to determine when the temperature is outside the relevant set range and also to identify temperature differentials that may exist throughout a room or space. The processor may also include control logic for executing certain control procedures in order to effectuate an appropriate control response based upon the information (temperature, air speed, relative humidity, etc.) communicated from sensors (130, 140, 150, 180, 190) and the setting automatically chosen by controller (160) or manually chosen by the occupant. An appropriate control response may be carried out through commands communicated from controller (160) to fan(s) (110) and/or HVAC system (200) (or thermostat (1110)) based on the control procedures. In some settings, varying fan speed as a function of sensed temperature and humidity may assist in avoiding condensation on objects within the same room as fan(s) (110); and/or may provide other effects.

As a merely illustrative example, the basis of the control logic may be derived from the thermal comfort equations in ASHRAE Standard 55-2010 and/or other relevant comfort related theory or research. The air speed and perceived temperature, as described below, may be derived from the SET method of ASHRAE Standard 55-2010 and/or other relevant comfort related theory or research. The control logic may incorporate such factors as temperature, relative humidity, air speed, light levels, physiological condition of a user, and/or other conditions which may exist; to determine how to most efficiently achieve acceptable levels of occupant thermal comfort. Controller (160) may learn the thermal preferences of the occupants during an initial "learning period." Controller (160) may then apply the control logic to the thermal preferences of the occupant to reduce the energy consumption of HVAC system (200) and fan(s) (110).

Communication between controller (160), HVAC system (200), fan(s) (110), and various sensors (130, 140, 150, 180, 190) may be accomplished by means of wired or wireless connections, RF transmission, infrared, Ethernet, or any other suitable and appropriate mechanism. Controller (160) may also be in communication with additional devices (which may include computers, portable telephones or other similar devices) via the Local Area Network, internet, cellular telephone networks or other suitable means, permitting manual override control or other adjustments to be performed remotely. System (100) may be controlled by wall-mounted control panels and/or handheld remotes. In some versions, system (100) may be controlled by a smart switch, an application on a smart phone, other mobile computing device. Such an application may include on/off, dimming, brightening, and Vacation Mode (as described below) among other options.

A smart switch could include sensors (130, 140, 150, 180), including one adapted for being positioned in a standard wall mounted box for receiving a conventional "Decora" style of light switch. Such a smart switch could be retrofitted within a space to provide information from sensors (130, 140, 150, 180) to controller (160). A smart switch may also comprise controller (160) in addition to or in lieu of sensors (130, 140, 150, 180). Such a smart switch could be retrofitted within a space to operate as controller (160) of exemplary system (100) by controlling any existing HVAC system (200), fan(s) (110), and/or any other climate and environmental control products. For instance, the controller (160) in a wall mounted form could provide temperature or other sensed information to control or influence the set point of an associated thermostat (1110).

The operation of the fan (110) may also be regulated independent of temperature. For instance, the speed of the fan (110) may be modulated (such as sinusoidally between a pre-determined or user-defined maximum and minimum) based on one or more of the fan size or diameter, the number or type of airfoils, and the height of the fan. This may be done, for example, while in the unoccupied heating state, where the periodic increase in speed would not impact user comfort. This may be done to optimize energy consumption while effectively mixing the air in a space.

The frequency at which the fan speed changes may also be adjusted by the user or automatically by the controller (160). In the occupied state, the regulation of the speed may be in accordance with a pre-determined or user-set minimum, and may always be done when the fan (110) is in heating mode to help distribute the warmer air that has risen. A factory set or predetermined minimum speed may also be used until adjusted by the user, at which point the user-selected speed may become the minimum speed used for the occupied heating mode.

As an example of the foregoing, the following table of data regarding the maximum and minimum speeds is provided based on fan type/size and height:

Speed Settings for Winter Mode (Destrat)

| Fan Model: HAIKU 52" | | | |
|---|---|---|---|
| Fan Elevation AFF | Occupied | Unoccupied | Cycle (min) |
| ≤9 ft | Speed 1.0 | Speed 1.0-Speed 2.0 | 4.266666667 |
| >9 ft | Speed 1.5 | Speed 1.5-Speed 2.5 | 4.266666667 |

| Fan Model: HAIKU 60" | | | |
|---|---|---|---|
| Fan Elevation AFF | Occupied | Unoccupied | Cycle (min) |
| <9 ft | Speed 1.0 | Speed 1.0-Speed 2.0 | 4.266666667 |
| 9 ft-10 ft | Speed 1.5 | Speed 1.5-Speed 2.5 | 4.266666667 |
| >10 ft | Speed 2.0 | Speed 2.0-Speed 3.0 | 4.266666667 |

| Fan Model: HAIKU 84" | | | |
|---|---|---|---|
| Fan Elevation AFF | Occupied | Unoccupied | Cycle (min) |
| <9 ft | 16.0 RPM | 16.0 RPM-45.0 RPM | 4.266666667 |
| 9 ft-10 ft | 18.0 RPM | 18.0 RPM-45.0 RPM | 4.266666667 |
| >10 ft | 18.0 RPM | 18.0 RPM-45.0 RPM | 4.266666667 |

The corresponding table is provided to relate the above speeds with RPM values for the exemplary fans:

| Speed | H52 | H60 | H84 |
|---|---|---|---|
| 1 | 48.5 | 35.0 | 44.0 |
| 2 | 79.0 | 70.0 | 64.0 |
| 3 | 94.0 | 85.0 | 82.0 |
| 4 | 140.0 | 120.0 | 98.0 |
| 5 | 165.0 | 155.0 | 113.0 |
| 6 | 177.0 | 175.0 | 124.0 |
| 7 | 200.0 | 200.0 | 133.0 |

In terms of a pre-determined maximum and minimum speed, these values may be empirically determined for a particular size or type of fan. For instance, the minimum speed of the fan could be assessed as the speed value for which there is an appreciable air movement at a particular distance from a fan as perceived by a person. Again, if the pre-determined minimum is deemed unacceptable, it may be adjusted by the user.

On the maximum side, the determination may be made based on whether a further increase in speed results in an appreciable amount of destratification. For example, presume that a sensed temperature differential of a particular amount ('0.5' degrees) between different locations (e.g., high and low) is a sufficient threshold for desirable air mixing. The maximum fan speed could thus be set to the value at which this threshold is met. This threshold could also potentially change depending on the application (large commercial space vs smaller residential space).

Figure 4:
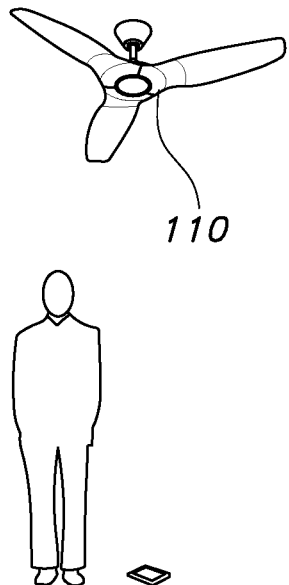
FIGS. 4-7 illustrate schematically determining a fan height using an image recording device.
Figure 5:
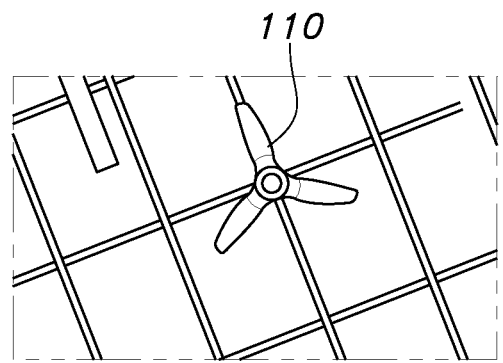
Figure 6:
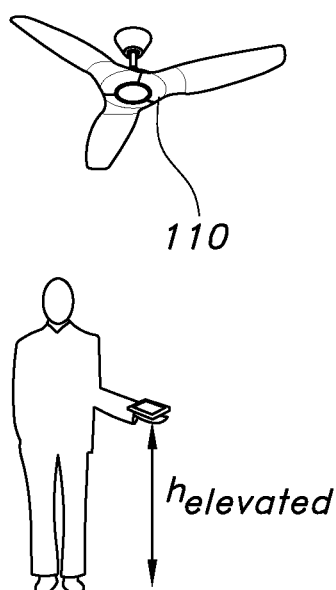
Figure 7:
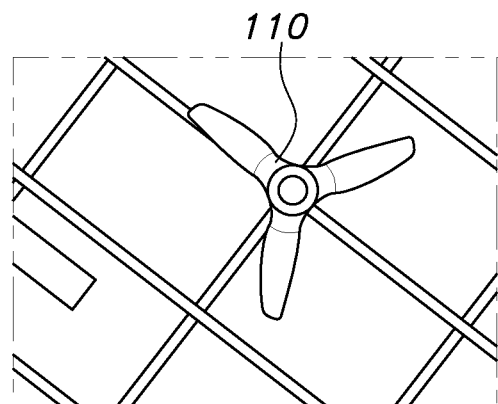

With reference now to FIGS. 4-7, a method for determining the height of a fan within a given space is proposed. The method may involve using an imaging device, such as a smart phone (200) having a camera, placed on a floor in the associated space to capture an image of the fan (110), as indicated in FIGS. 4 and 5. The user then places the imaging device (phone) on an object having a known height (represented as $h_{elevated}$ in FIG. 6), and takes a second image. The object may, for example, comprise a shipping box for the fan (110) itself, which could be printed with indicia indicative of height (or, for example, a bar code than can be scanned to provide an indication of height).

The following equations may then be used to calculate the height of the fan image, such as by using a software application on the phone (200). This equation may be used to calculate the height of a projected image using a pinhole camera:

$$\text{height}_{image} = -\text{focal\_length} \frac{\text{height}_{actual}}{\text{distance\_to\_object}}$$

This equation may be modified to represent the distance to an object in an image for a lens of a given focal length:

$$\text{focal}_{length} = \frac{\text{size}_{image} \times \text{distance\_to\_object}}{\text{size}_{actual}}$$

In terms of fan images, the focal length and actual size are not known:

$$\text{focal}_{length} = \frac{\text{diameter}_{pixels} \times \text{distance}}{\text{diameter}_{actual}}$$

The equations for the two photos can be written as:

$$f = \frac{\text{diameter}_{pixels\_floor} \times \text{distance}_{AFF}}{\text{diameter}_{fan}}, \text{ and}$$

$$f = \frac{\text{diameter}_{pixels\_elevated} \times (\text{distance}_{AFF} - h_{elevated})}{\text{diameter}_{fan}}$$

Solving for the unknown distance above the floor:

$$\text{distance}_{AFF} = \frac{h_{elevated}}{1 - \text{diameter}_{pixels\_floor}/\text{diameter}_{pixels\_elevated}}$$

Assuming the second photo was taken at a height of 48 inches (which could be inputted by the user), and the images are 244 pixels (low) and 366 pixels (elevated), respectively:

$$\text{distance}_{AFF} = \frac{48 \text{ inches}}{1 - 244 \text{ pixels}/366 \text{ pixels}} = 144 \text{ inches} = 12 \text{ feet}$$

The height may then be used in connection with control of the fan (110) in the manner outlined in this description.

As noted above, the control system (100) or the fan (110) itself may also communicate with a thermostat (1110) in the zone or room, as mentioned above. In one possible embodiment, as illustrated schematically in FIG. 8, the system (100) or fan (110) detects when the thermostat (1110) is placed into a "heating" mode of operation. When this occurs, the fan (110) may be automatically switched into a "Winter Mode" of operation, whereby the fan operates in a particular manner in order to help destratify the air in the room.

In one possible version of "Winter Mode", the fan (110) is caused to operate in a forward direction at a particular speed correlated to the height of the blades or airfoils of the fan (which height as noted above may be provided via a user input based on an estimation or may be determined using a typical camera associated with a "smart" phone or like device), as well as based on the fan diameter, the number of foils or blades, and the type or shape of materials used. Thus, for example, when a particular height is provided or determined, the fan (110) may be operated at a particular predetermined speed deemed appropriate for the particular conditions (see above table), which speed of course may be user-adjusted to assure comfort.

In this or another version, the fan (110) may also be caused to operate at a user-selected speed when room occupancy is sensed (by a sensor associated with the fan (110) or a thermostat able to communicate occupancy information to the fan (110)), but then operate at a different condition when the room is determined to be unoccupied (including possibly to disable the operation of the fan, or cause it to operate at a higher speed than when the room is determined to be occupied). Likewise, the fan (110) may be turned off in Winter Mode when occupancy is sensed, but may then automatically turn on when the lack of occupancy is detected.

Also, if a room is determined to be occupied and the fan (110) set to operate corresponding to Winter Mode, the maximum fan speed may be automatically decreased if the user lowers the fan speed, as this would serve as an indication that the maximum fan speed was too high for the given conditions. The fan (110) would persist under this condition until the user elects to change the fan speed again manually, or disables the Winter Mode feature. The particular operating conditions may be determined by the user preferences, or pre-programmed based on estimated desirable speeds for a given height of the fan airfoils, which may be empirically determined.

It is possible that more than one fan speed may be deemed to be acceptable during times when the room is occupied. In such case, the system (100) may modulate the fan speed within pre-determined ranges based on measured temperature differentials. This may be done, for example, by using the outputs of the high and low sensors (130, 140), which may be associated with the fan (110) and thermostat (1110), respectively.

System (100) could be used in combination with a heating system (e.g. radiant heat flooring, steam pipe radiator systems, etc.) in addition to or in lieu of being used with HVAC system (200). Thermal comfort control system (100) may operate as discussed above to determine and change or maintain the temperature at the level of occupancy within a room. Fans (110) may be utilized to evenly distribute heat from the radiant heat source throughout the entire space. This may improve energy efficiency and decrease warm-up and/or cool-down time within the space.

Thermal comfort control system (100) may be programmed to learn preferences of the occupant over a period of time. As an example of such a capability, controller (160) may determine, as a result of the occupant's preferences over time, that the occupant prefers a certain relative humidity level in combination with a particular fan speed and/or temperature setting, or vice versa. Such preferences may be established for particular periods of time, for instance during particular times of the year such that controller (160) may establish different occupancy preferences for different times during the year; or such preferences may be established for particular external conditions which may exist as discussed above such that controller (160) may establish different occupancy preferences for different external conditions.

Automated dampers or registers (170) may also be included within HVAC system (200) to rebalance the supply of conditioned air from HVAC system by automatically diverting air to occupied zones and away from unoccupied zones. Such dampers would allow controller (160) to divert air that would otherwise be wasted on unoccupied zones to those zones which are occupied. The automated dampers may be driven by motors, solenoids, etc. that are in communication with controller (160).

Controller (160) may be capable of maintaining a lower temperature (in winter) or higher temperature (in summer) in those rooms that are unoccupied, for instance by varying the temperature limit by 2° F.-3° F. until a room becomes occupied. As described in more detail below, controller (160) may be integrated with other thermal control products in each room or zone to facilitate more efficient climate control. Controller (160) may also be capable of modulating a variable compressor or variable fan HVAC system based upon the state of automated dampers (e.g., as more dampers in a system are closed, the master controller may elect to reduce the compressor rate or fan rate of an HVAC system in order to reduce energy consumption and to protect the system from over-heating)

Another benefit of the exemplary control system (100) is that it may provide scheduled thermal control, whereas traditionally an HVAC system (200) ran around the clock. Controller (160) may be programmed to operate fans (110) and/or HVAC system (200) only during particular times. An example of such a time may be when the occupant is typically at work. Controller (160) may also be programmed to determine appropriate control responses based upon different settings or temperature set ranges during particular times. An example of such a time may be when the occupant is sleeping; controller (160) may be programmed to a lower temperature set range (during winter) or a higher temperature set range (during summer) during this time, and then may begin to raise (during winter) or lower (during summer) the temperature at a time just before the occupant typically awakens.

The system (100) may also be programmed for less routine events, such as vacation ("Vacation Mode"), when, as described above, the system may shutdown fans (110) and/or HVAC system (200) or determine appropriate control responses based upon different settings or temperature set ranges. Such a "Vacation Mode" or other less routine operations may be manually triggered by the occupant and/or automatically triggered by thermal control system (100) after a lack of occupancy is sensed for an established threshold period.

During "Vacation Mode", controller (160) may increase energy efficiency by not operating HVAC system (200) and/or fan(s) (110), or by operating HVAC system (200) and/or fan(s) (110) at more efficient energy levels. As discussed below, such operations may be tied into other any number of climate control products. In addition, system (100) may reset or otherwise reduce power consumption by a water heater and/or other equipment capable of such control during a "Vacation Mode". Temperature data obtained could also be used to determine when a room is in or approaching a pre-programmed undesirable condition (i.e., near or below freezing), in which case the master controller (160) may be activated to prevent damage from occurring (such as to plumbing).

As shown in FIG. 3, exemplary thermal comfort control system (100) described above may be combined with any number of climate and environmental control products, and the capabilities and operations discussed above may be configured to include any number of climate and environmental control products. An example of such an additional product would be automated blinds (920) that may be opened or closed (fully or modulated to a particular amount) depending upon the light levels being introduced into the space at any particular moment. The blinds (920) may also be set in a "privacy" mode to prevent them from being opened when intentionally closed.

Another example of such a product would be an air purifier (922) that may be utilized to improve the air quality within a room based upon air quality measurements taken by sensors (130, 140) described above. Yet another example of such a product would be an air humidifier or dehumidifier (924) to control the relative humidity within a room based upon the relative humidity measurements taken by sensors (130,140). Yet another example of such a product would be a water heater (926). Yet another example of such a product would be a scent generator (928) which may include an air freshener or other scent generating products for the purpose of distributing aromatic scents or air quality enhancements throughout all the spaces or only particular spaces. Controller (160) may also be integrated with other network systems that will allow for additional features to be controlled such as lighting and music among others.

According to a further aspect of the disclosure, and with reference to FIG. 8, a fan (110) or group of fans (110, 110a) may be connected to another device that controls the heating or cooling (HVAC) system (200) for supplying conditioned air to a given space, such as a thermostat (1100). The fan (110) or group of fans (110a) may then adjust to operate based upon the thermostat (1100). For example, the adjustment or regulation of the fan(s) (110, 110a) can be based on a reported temperature from the thermostat (1110) or a set point temperature thereof.

Figure 9:
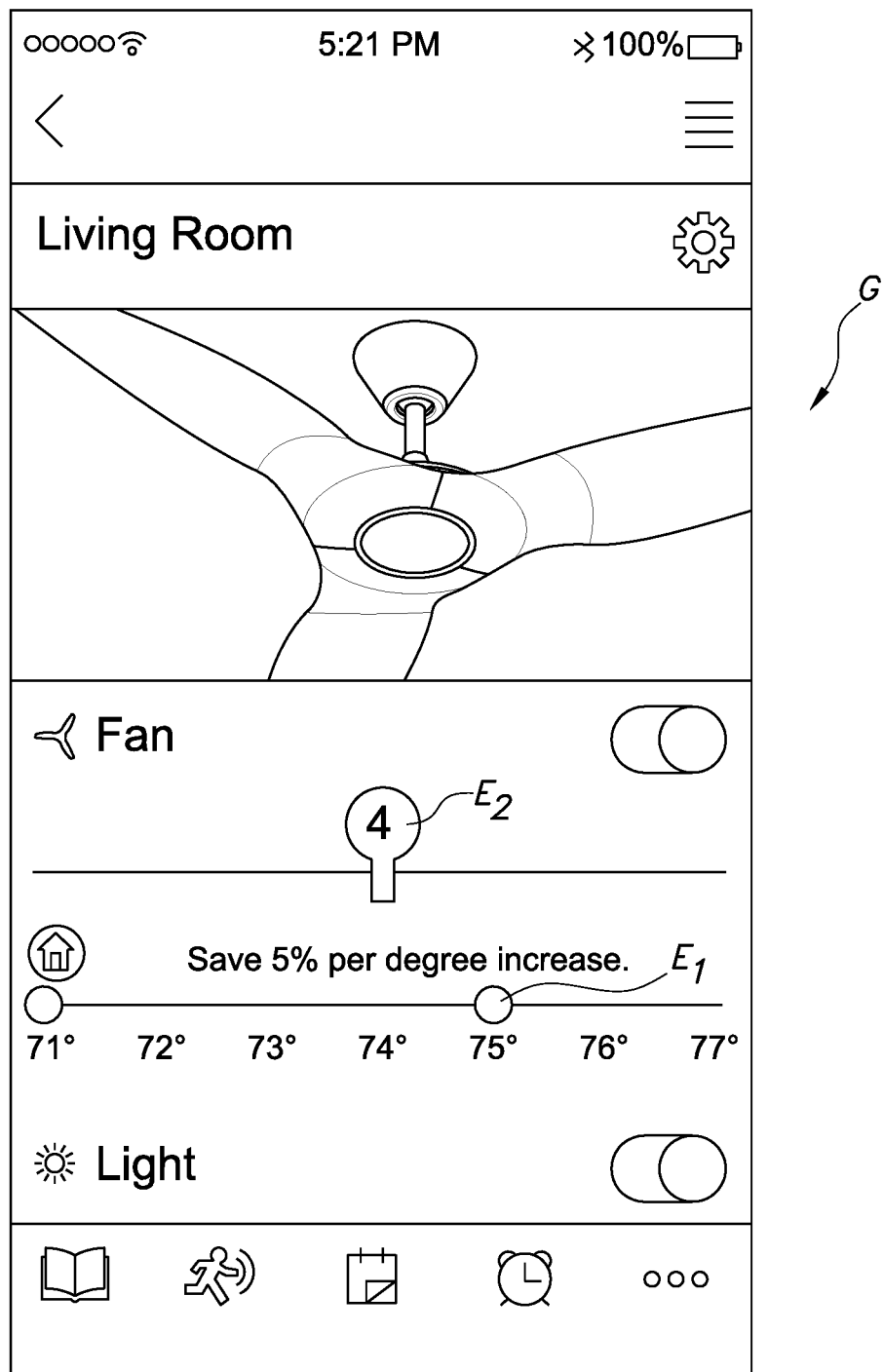
FIG. 9 shows an example of a user interface.
Figure 10:
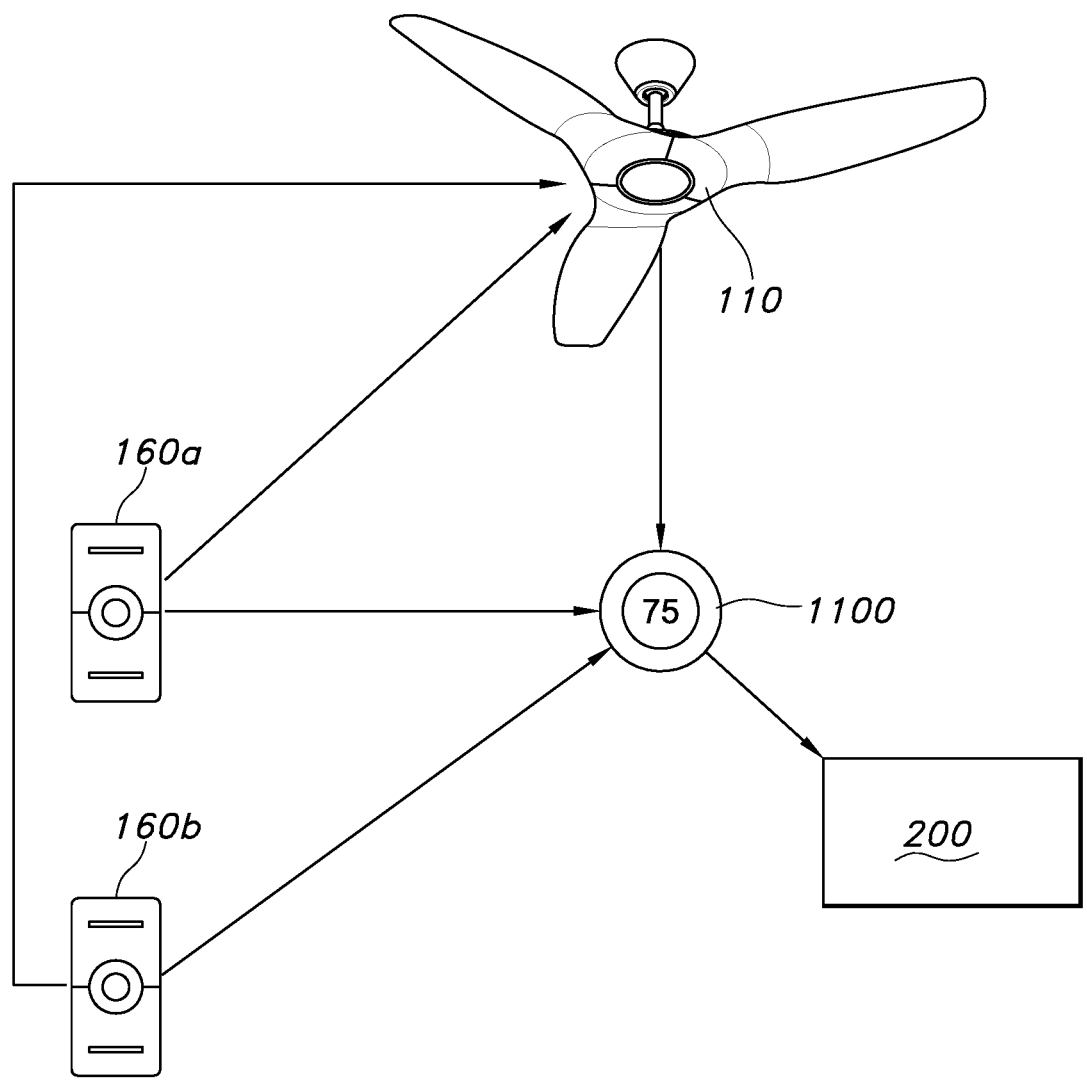
FIG. 10 shows an arrangement wherein a thermostat may be influenced by conditions sensed at remote locations.

In one example, the fan operation can reduce the sensed temperature, and thus make it feel cooler than the actual temperature in a room. Consequently, it is possible to then raise the set point on the control device, such as thermostat (1100), higher. This may be done automatically (such as by controller (160)), or upon request by a user using any type of controller (such as a remote control device (D), including possibly a mobile or fixed (e.g., wall mounted) computer; see FIG. 9).

The controller, such as device (D), may be programmed to automatically suggest the higher temperature (see element (E1) on a graphical user interface (G) for remote control (D)). This may, be a suggested adjustment based on the state of the fan (110); e.g., speed 4, as indicated by graphical element (E2), or simply an indication that the fan is operational. This adjustment may be selected by the user to adjust the thermostat (1110), or a different temperature may be automatically selected. The fan (110) and thermostat (1110) may then learn the new, energy-efficient preferences and adjust accordingly (e.g., when a particular fan speed is selected for a given temperature, the thermostat (1110) may automatically adjust to a higher temperature).

In another example, the fan (110) or fans may operate based on the status of the device that is controlling the heating or cooling (HVAC) system (200), such as for example thermostat (1110). For example, the fan or fans may adapt to a "cooling" mode or a "mixing" mode (see above) depending on whether the HVAC system (200) is set to providing cooling or heating. The communication may be done over a communications network (either local or the Internet), and may be achieved by the fan(s) (110, 110a) communicating with the thermostat (1110) (lines A and B), or one communicating with the thermostat and controlling the other fan (line C), which may be done via wired or wireless communication. The fan (110) may also be programmed to detect if the thermostat (1110) controls a cooling system, a heating system, or both, as well as related temperature thresholds.

Figure 11:
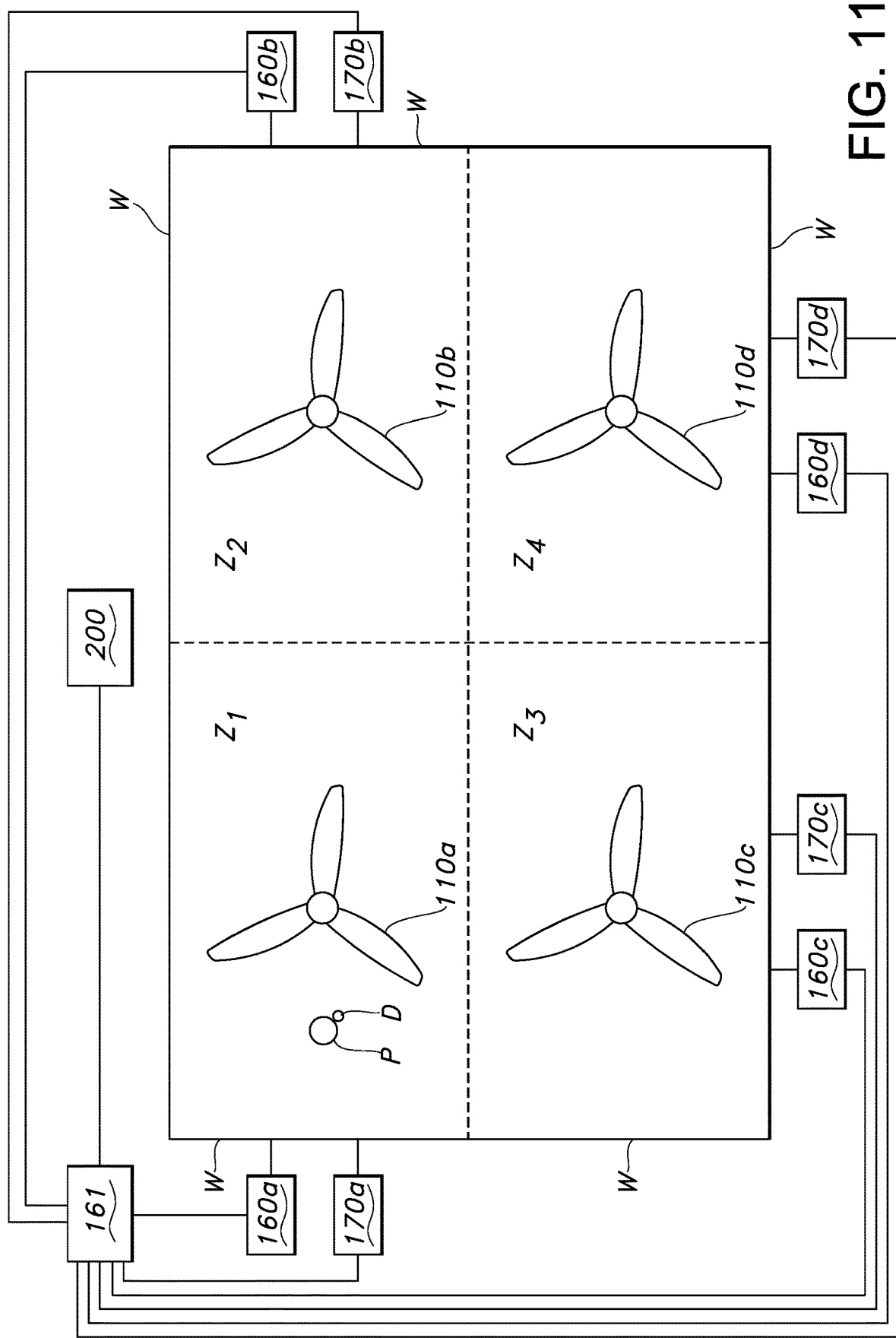
FIG. 11 shows an arrangement wherein controllers associated with various zones may be used to effect control of thermal comfort conditions.

Likewise, one or more sensors (130, 140, 150, 180) may be associated with the fan (110), as noted above. In the case of a temperature sensor, which in the case of a ceiling fan would be the contemplated "high-elevation" sensor (140), a temperature reading may be used to adjust the temperature set point, such as associated with a thermostat (1110), as indicated in FIG. 11. This helps to ensure that the heating or cooling (e.g., HVAC) system may operate to satisfy a temperature in the area corresponding to the fan (110). A particular fan (110) associated with a set room preference or an occupancy state may be selected to control the temperature set point and thus regulate the conditioning device, such as an HVAC system (200), associated with the thermostat (1110). Alternatively, the fan (110) may itself incorporate the thermostat (1110), which may be controlled remotely.

As noted above, the same functionality may be provided by way of one or more controllers (160) in the form of wall controls (two shown, 160*a*, 160*b*, but one or more may be used) having sensing capabilities (e.g., temperature, humidity, occupancy, etc.), and also the ability to control one or more associated devices. For instance, a condition sensed by one of the wall controllers (160*a*) can be used to adjust the set point temperature of the thermostat (1110), as well as to regulate the operation of the fan (110) or lights (whether associated with the fan or otherwise). Furthermore, conditions sensed by more than one of the wall controls (160*a*, 160*b*) can be used similarly to provide corresponding regulation of the environmental conditions, such as by designating one of the wall controls (160*a*, 160*b*) to be a master control, or both may be used to control different thermostats (1110), such as associated with different spaces or floors in a building.

In lieu of a conventional thermostat, a wall control (160*a* or 160*b*) may also be used to function as a zone thermostat in addition to serving as a sensing wall control for fans (110) and lights (associated with or independent of fan(s)). As such, sensor inputs (temperature, occupancy (motion or thermal image), humidity, may be used to adjust HVAC heating or cooling set points, to modulate zone dampers or adjust HVAC blower speed, in addition to controlling fan(s) or light(s).

As an example, FIG. 11. Shows a space including four zones (Z1-Z4, each associated with a wall (W) to which a wall control (160*a*-160*b*) is mounted. One wall control (160*a*) may measure lack of motion in an associated zone (Z1) for some period of time and close the damper (170*a*) (or dampers) for that zone and adjust the HVAC system (200) to compensate for the closed zones, such as through an intermediate (zone) controller (161). As another example, a person (P) in the zone may adjust the zone set point lower because she is hot by pressing a button on the wall controller (160*a*) associated with that zone (Z1). The wall control (160*a*, 160*b*) could then adjust the speed of fan (110*a*) to increase air movement in the room and also open the zone damper (170*a*) (or dampers) and HVAC system (200) to supply more conditioned air into the zone (Z1). This may be independently done for each corresponding zone (Z1-Z4).

The or each wall control (160*a*-160*d*) may have a means for providing the user with status of the equipment or environment through an integrated user interface, or by means of a remote user interface (e.g. app over LAN or web page over a global communications network, such as the Internet) for running on a device (D) carried by a person (P). In this case, at least one controller may be installed in each zone (Z1-Z4 in FIG. 11) and may communicate directly with the HVAC system (200) over a secure, wireless network (such as Thread). Because each wall controller (160*a*-160*d*) is serving as zone temperature sensing device and communicates directly with the HVAC system (200) and zone controller (161), a traditional thermostat is not necessary for proper equipment operation. While four zones and associated devices are shown, it should be appreciated that any number of zones and associated devices may be provided in a given space.

Furthermore, using the control (160) the user may elect to set a minimum or maximum fan speed, such as applicable to either summer mode or winter mode, or both. Additional information about a space such as fan height from floor, number/type/material of the blades or airfoils, or room size may be provided by the user to optimize performance (as outlined in the foregoing description). A user may also elect to increase the activation threshold for the control device (e.g., thermostat (1110) at the time of configuration (i.e., raise the temperature set point during the summer). Further, the user may be enticed to increase the activation threshold through notifications by means of an Internet-connected device, such as a mobile computer (e.g., a "smart" phone or laptop computer).

Once communication has been established between the fan (110) or fans and the heating/cooling system (200), the user may elect to activate or deactivate one or both of the fan modes. Upon activation of cooling mode, the user may elect to increase the cooling threshold of the thermostat (1110). In doing so, the cooling mode 'effective temperature' of the fan (110) or fans may be set by default to the previous thermostat cooling threshold. If the thermostat (1110) is in a cooling state, then the fan (110) may automatically change its state to cooling mode without user intervention. If the thermostat (1110) is in a heating state, then the fan (110) or fans may automatically change state to mixing mode without user intervention. Hysteresis may be applied to prevent the fan state from changing too rapidly. The user may also elect to disable a fan (110, 110*a*) in the event that the thermostat (1110) is neither heating nor cooling.

A cooling state can be ascertained by a) directly reading the state of the thermostat (1110) or b) reading the ambient temperature reported by the thermostat (1110) as well as its cooling threshold. In this case, if the ambient temperature is greater than (or equal to) the cooling threshold, then it can be assumed that the thermostat (1110) is in a cooling state. In order to conserve energy, fan (110) may only operate when presence is detected in a space (such as by an occupancy detector associated with the fan, the thermostat, or both; note thermostat (1110) detecting individual I in FIG. 8).

A heating state can be ascertained by a) directly reading the state of the thermostat (1110) or b) reading the ambient temperature reported by the thermostat as well as its heating threshold. In this case, if the ambient temperature is greater less than (or equal to) the heating threshold, then it can be assumed that the thermostat (1110) is in a heating state.

Another aspect of the disclosure relates to the ability to calculate energy usage of the fan (110) and HVAC system (200). The fan (110) or an associated controller may then send electronic notifications to the user with recommendations on how to improve system configuration in order to further conserve energy.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. As a further example, the technologies may be adapted to buildings having multiple spaces in which different ventilation or circulation devices are provided (e.g., a space with a fan may or may not be conditioned, and may be in a building with a space that is conditioned but does not include a fan; diffusers may be used to regulate the provision of conditioned air to any space based on the sensed conditions therein, and the fan (110) or HVAC unit (200) may be regulated accordingly based on the sensed conditions, including possibly by one or more fan(s) in the space(s)). Accordingly, the scope of the present invention should be considered in terms of claims that may be presented, and is understood not to be limited to the details of structure and operation shown and described in the specification and drawings.

The invention claimed is:

1. A fan system for a space associated with a conditioner for conditioning air in the space, comprising:
- a sensor for measuring a temperature in the space;
- a controller for controlling the conditioner based on the temperature sensed by the sensor; and
- a fan, separate from the conditioner, said fan adapted for circulating air within the space based on the temperature sensed by the sensor;
- wherein the controller includes a set point temperature for regulating the on/off condition of the conditioner, and is adapted for adjusting the set point temperature based on the temperature sensed by the sensor.

2. The fan system of claim 1, wherein the controller comprises a thermostat, and the sensor is connected to the thermostat.

3. The fan system of claim 1, wherein the fan is adapted for being mounted to a ceiling in the space.

4. The fan system of claim 1, wherein the sensor is connected to the fan.

* * * * *